Aug. 6, 1968  E. ABRAHAMSON  3,396,332
RESISTANCE MEASURING BRIDGE CIRCUIT HAVING AUTOMATIC BRIDGE
BALANCING AND RANGE SELECTING MEANS
Filed Dec. 7, 1965  5 Sheets-Sheet 1

INVENTOR
Edmund Abrahamson
BY Spencer & Kaye
ATTORNEYS

INVENTOR
Edmund Abrahamson
BY Spencer & Kaye
ATTORNEYS

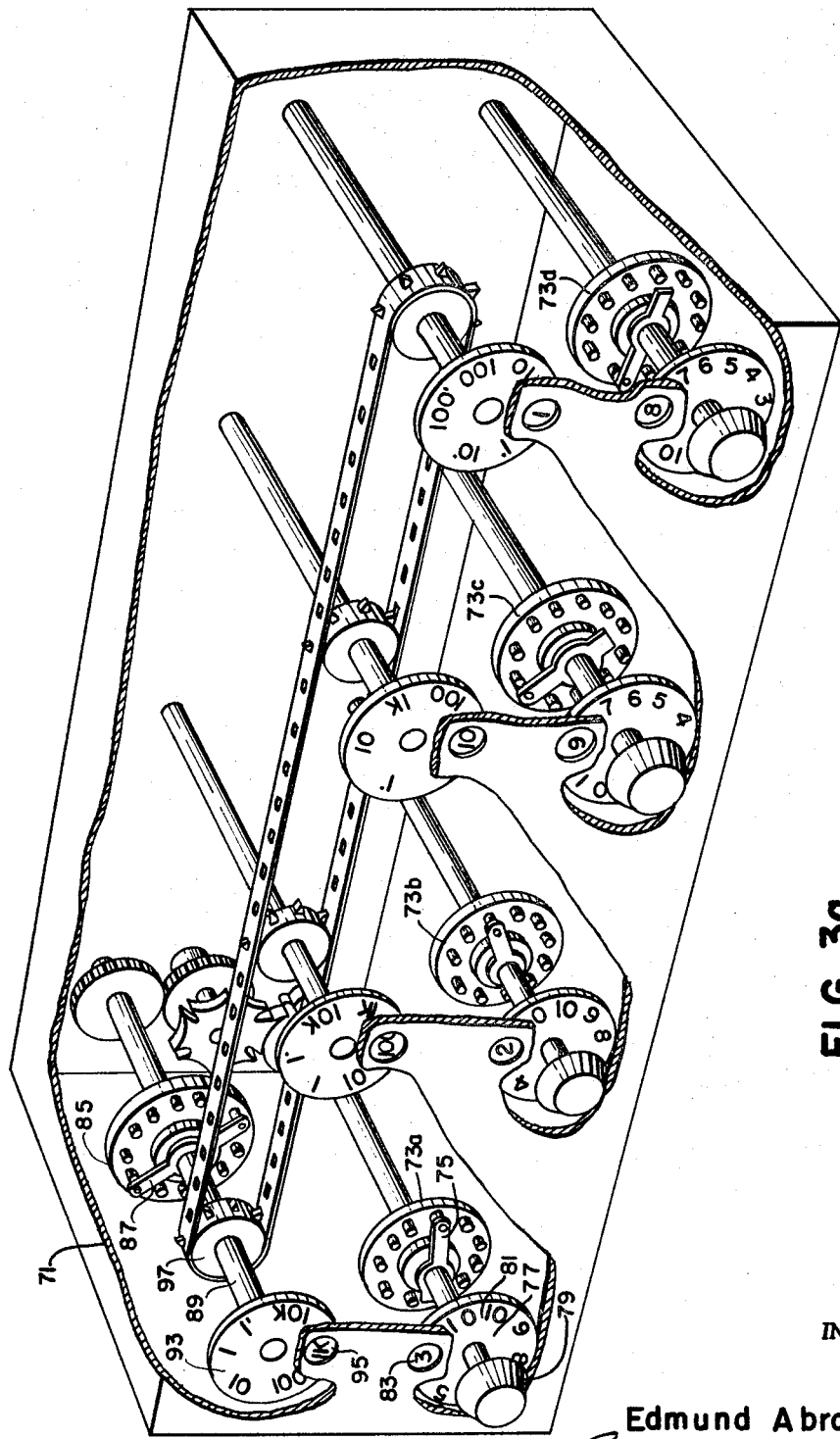

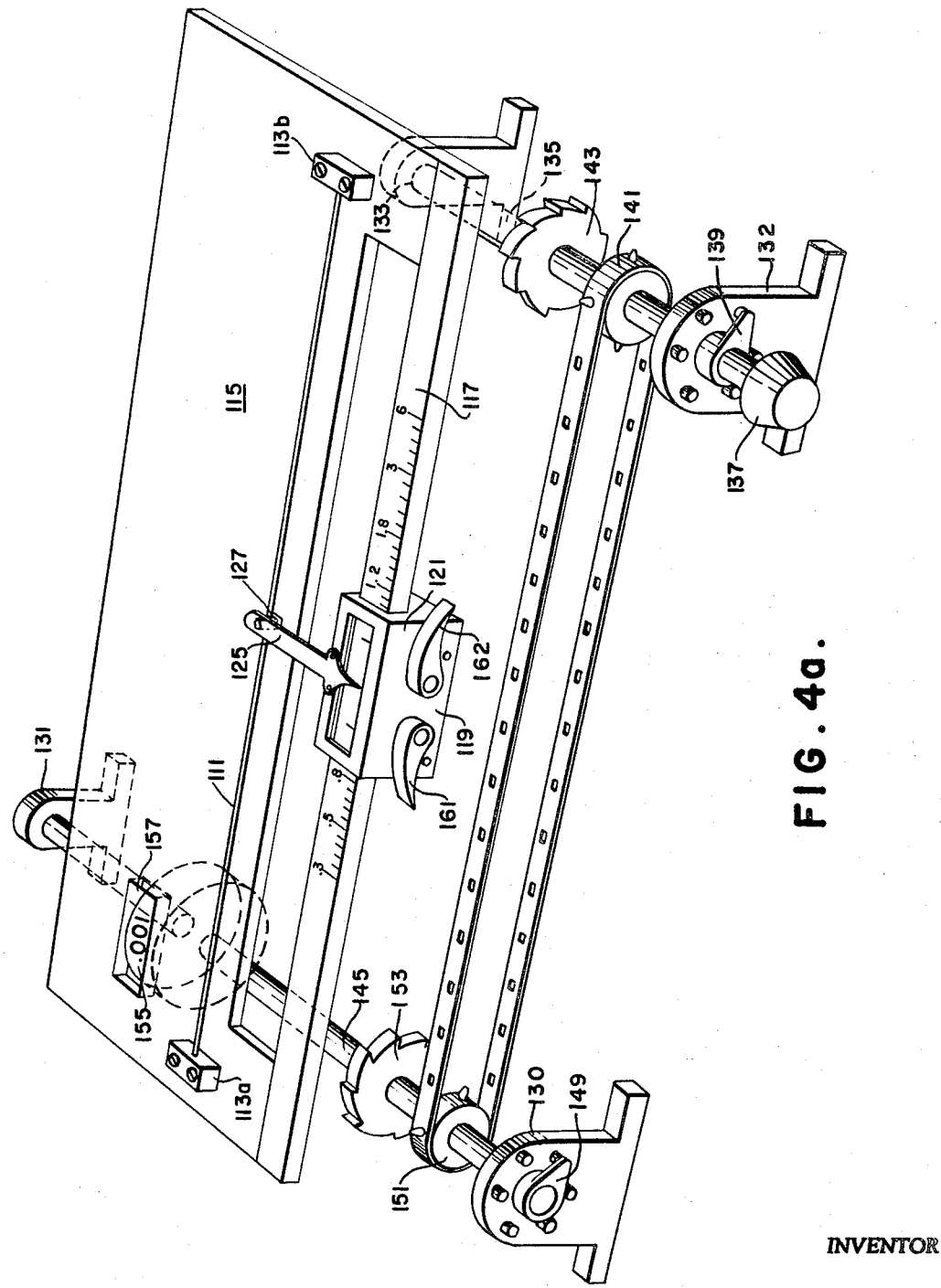

Aug. 6, 1968  E. ABRAHAMSON  3,396,332
RESISTANCE MEASURING BRIDGE CIRCUIT HAVING AUTOMATIC BRIDGE
BALANCING AND RANGE SELECTING MEANS
Filed Dec. 7, 1965  5 Sheets-Sheet 5

INVENTOR
Edmund Abrahamson
BY *Spencer & Kaye*
ATTORNEYS

United States Patent Office 3,396,332
Patented Aug. 6, 1968

3,396,332
RESISTANCE MEASURING BRIDGE CIRCUIT
HAVING AUTOMATIC BRIDGE BALANCING
AND RANGE SELECTING MEANS
Edmund Abrahamson, 29 Primrose Lane,
Roosevelt, N.Y. 11575
Filed Dec. 7, 1965, Ser. No. 512,053
17 Claims. (Cl. 324—62)

The present invention relates to measuring instruments and control devices and, more particularly, to measuring instruments incorporating a bridge circuit to obtain a measurement of an unknown quantity which measurement is shown on a dial or scale.

Generally, such instruments include a bridge circuit which is varied by range selector controls, e.g., switches which, upon actuation, create a multiplication or division of the basic range.

In a typical Wheatstone slide wire bridge arrangement comprising a galvanometer as the balancing indicator, a slide wire as the ratio arms of the bridge, and a range selector switch, an unknown resistance is measured in the following manner. The unknown resistance is inserted in the circuit and the range selector switch is set on a contact point in which range the operator believes the resistance to be. After activating the circuit, the operator moves a sliding contact along the slide wire while watching the movement of the galvanometer pointer which will have no deflection when the proper resistance on the slide wire has been selected. If, however, the bridge cannot be balanced, which is the case when the galvanometer pointer cannot be nulled, the above procedure must be repeated again and again by either setting the range selector switch on a higher or lower range. The direction in which the needle of the galvanometer moves indicates whether the higher or lower range shall be selected. After the correct range has been selected, where it is possible to adjust the ratio arms of the bridge to achieve a balancing thereof, the reading is taken at that point and multiplied by the value shown on the range selector switch due to the ratio characteristics of the bridge circuit. Accordingly, the balancing of a bridge circuit is a tedious and time-consuming procedure in that the contact for the slide wire must be moved over the full length of the wire and then another range must be selected until the bridge is balanced.

It is therefore an object of the present invention to provide means for simplifying the tedious and time-consuming procedure of balancing a bridge circuit.

It is another object of the present invention to provide a measuring instrument having an automatic bridge control and range selector circuit.

It is a further object of the present invention to provide an automatic bridge control and range selector circuit which is driven by a motor.

According to the present invention, the time-consuming balancing procedure, wherein a plurality of knobs must be set in order to achieve the desired balance, is overcome by providing means for coupling the ratio resistances of the bridge arrangement to the range selector of the bridge. Thus, it is possible, with but a single control means such as a knob, to continuously change not only the ratio arms of the bridge but also the multiplication factor in order to balance the bridge.

In accordance with a feature of the present invention, the coupling means includes a Geneva wheel and a reversing gear arrangement wherein the range selector switch is maintained in its proper position and the movement of the shaft of the range selector is in the same direction as that of the shaft ratio arm of the bridge. Indicating means are provided on the end of the respective shaft for indicating the value of the resistance at different positions of the shafts.

In accordance with another feature of the invention, a motor may be provided for the embodiments of the present invention whereby the motor drives the contact arms for the ratio resistances and the range selector switch until a balance is achieved, and then automatically shuts off.

Additional objects and advantages of the present invention will become apparent upon consideration of the following description when taken in conjunction with the accompanying drawings in which:

FIGURE 1b is a circuit diagram of the electrical connections for the bridge arrangement of FIGURE 1a.

FIGURE 3a is a schematic perspective view of a decade box bridge arrangement according to the present invention.

FIGURE 3b is a circuit diagram for the bridge arrangement of FIGURE 3a.

FIGURE 4a is a schematic perspective view of a further embodiment of the invention including a Kelvin bridge arrangement.

FIGURE 4b is a circuit diagram for the bridge arrangement of FIGURE 4a.

Figure 1A:
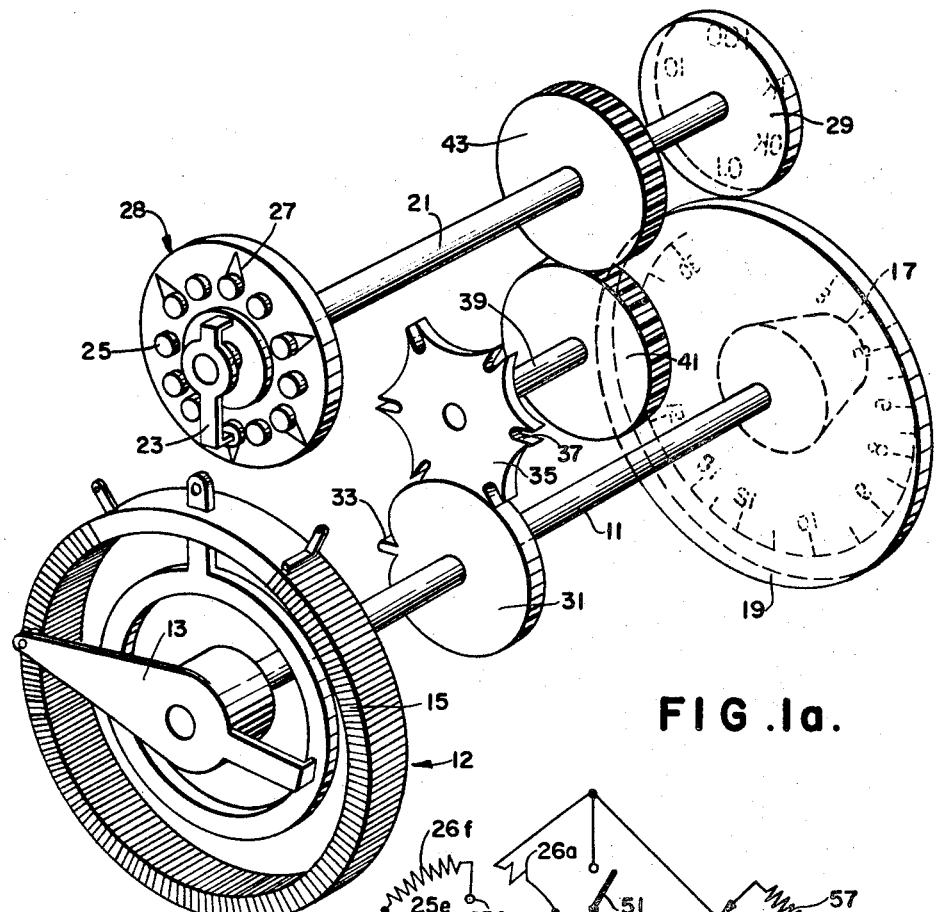
FIGURE 1a is a schematic perspective view of one embodiment of the present invention.

Referring now to the drawings, there is shown in FIGURE 1a an arrangement for the measuring instrument of the present invention. The arrangement includes a drive shaft 11 having a variable resistance such as potentiometer 12 at one end, comprising a contact arm 13 and a resistor 15, the contact arm being driven by the drive shaft which may be turned by a knob 17 connected at the other end and having a calibrated dial 19 connected thereto. There is also provided another shaft 21 having a contact arm 23 at one end for engaging contacts 25 which are embedded in a bearing piece 27 for the shaft. The bearing piece 27 and the potentiometer 12 are secured against rotation with the shafts by any suitable means (not shown) and the shafts are also supported by suitable members (not shown). Resistors of different ohmic value are connected to individual contacts to form a range selector switch 28 for the instrument. At the other end of the shaft 21 there is provided a range dial 29 mounted in the same plane as the dial 19. The aforedescribed components are generally present in bridge circuits in measuring instruments, with the embodiment according to the present invention providing means for coupling the potentiometer mounted on drive shaft 11 to the range selector mounted on the drive shafe 21. As shown, the coupling means includes a Geneva movement having a driving disc 31 mounted on the shaft 11 and having a single tooth 33 at the peripheral edge thereof and a cam 35 having notches 37 at the periphery thereof for engagement with the tooth 33. The disc 35 is mounted on a shaft 39 having a toothed wheel 41 attached thereto and engaging a further toothed wheel 43 mounted on shaft 21 to form an idler gear whereby shaft 21 turns in the same direction as that of shaft 11.

Figure 1B:
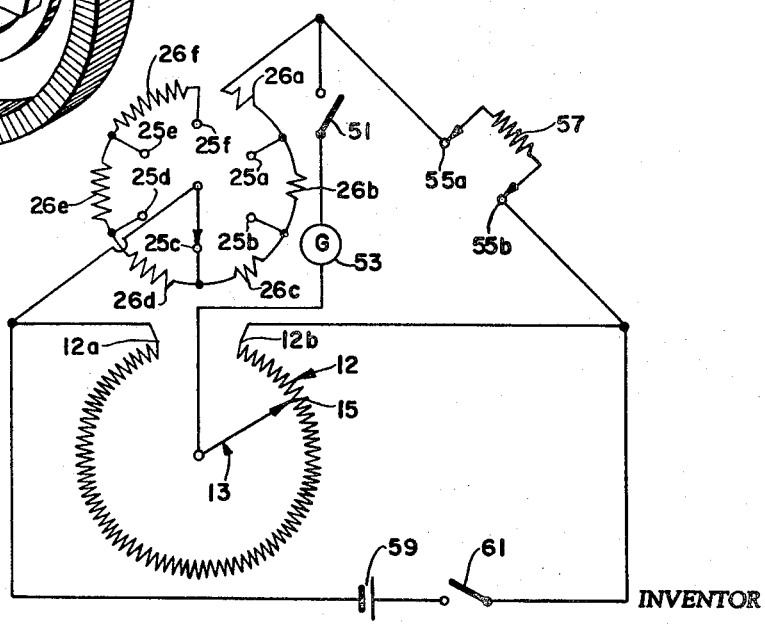

For purposes of clarity, the bridge circuit configuration for the arrangement of FIGURE 1a is shown in FIGURE 1b. As shown, one terminal 12a of the potentiometer 12 is connected to the contact arm 23 of the range selector switch. The range selector is provided with a plurality of resistors 26a to 26f of different resistances connected in series between the contacts 25 of the range selector 28 so as to provide a resistance in suitable steps such as 100 ohms, 1 K., 10 K., etc. The resistors do not have to be connected in series and may be connected in any suitable manner to provide stepped resistances as is known in the art. One terminal of resistor 26a, which is the smallest resistance, is connected to a junction of a switch 51, which in turn is connected to one terminal of a suitable detector such as a galvanometer 53, and one binding post 55a having one terminal of the unknown resistance 57 connected thereto. The other terminal of the galvanometer 53 is connected to contact arm 13 of the potentiometer 12 and terminal 12b of the potentiometer is connected to the other binding post 55b having the other terminal of the unknown resistance 57 connected thereto. A battery 59 and a switch 61 connected in series are connected across the terminals of the potentiometer 12. There is thus provided a Wheatstone bridge arrangement wherein the potentiometer 12 forms two arms of the bridge and the range selector and the unknown resistance form the other arms of the bridge circuit.

The operation of the arrangement of FIGURE 1 is such that the turning of the knob 17 will cause the contact arm 13 of the potentiometer 12 to move along the slide wire resistance path. This movement is indicated by a corresponding movement of the calibrated dial 19 which is calibrated in terms of the ratio of that portion of the resistive path already traversed to the remaining portion of the resistive path which, when multiplied by the number shown on the range dial, at the time the galvanometer is balanced, results in a measure of the unknown resistance 57. If, however, the galvanometer is not nulled during one traversal of the resistive path of the potentiometer 12 by the contact arm 13, as the contact arm is further turned the Geneva movement will engage, causing a shifting of the shaft 21 and thereby moving the contact arm 23 to another contact 25. For example, the contact arm 23 may be moved from contact 25a to contact 25b, thereby inserting additional resistance 26b into the circuit which results in the range selector switch being operated at the next higher range. Depending on the sense of rotation of the Geneva movement, which in turn depends upon the movement of the galvanometer pointer, the range selector may also be switched to a lower range. It is also noted that the switching of the range selector switch takes place during the movement of the contact arm 13 over the unwound portion of the potentiometer 12. It is further noted that the use of the Geneva wheel causes the range selector switch 28 to be locked in its position during the period of the movement of the contact arm over the slide wire resistor 15.

Thus, it is now possible with but a single knob, to move the contact arm over the full length of the winding path by turning it fully around beyond its actual travel path on the wire, with the measuring instrument automatically going from one range to another until the galvanometer is nulled, thereby balancing the Wheatstone bridge arrangement and providing a measurement of the unknown resistance.

Figure 2:
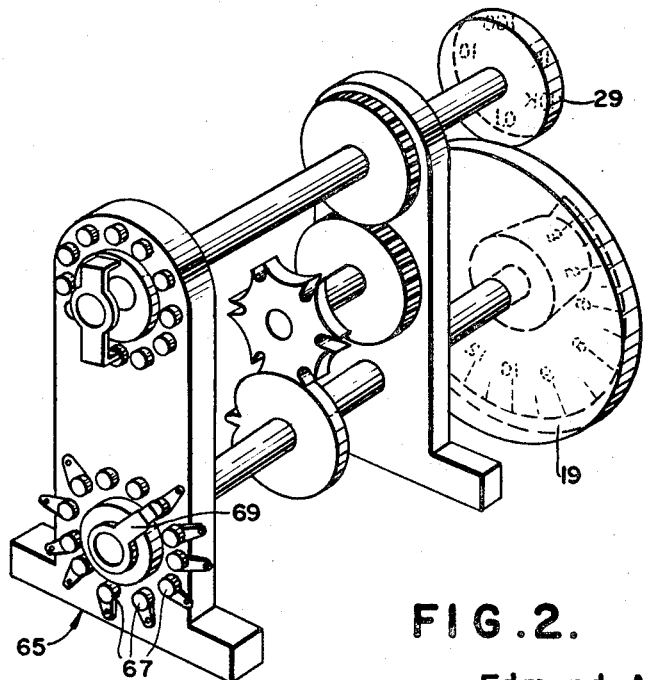
FIGURE 2 is a schematic perspective view of another embodiment of the invention including a decade switch forming the ratio arms of the bridge.

In FIGURE 2, there is shown another embodiment of the present invention wherein the potentiometer 12 of FIGURE 1 is replaced by a decade switch 65 having a plurality of contacts 67 and a contact arm 69 arranged in a manner similar to the range selector switch 28 of FIGURE 1. The decade switch comprises ten equal sized resistors in series connection so as to provide a stepped resistive path as the contact arm 67 is moved from one contact to another. One resistor is connected between a pair of the lugs 70 provided on the contacts, thereby providing for nine resistors with the other resistor having one terminal connected to a lug and the other terminal connected to one of the binding posts for the unknown resistance. This resistor forms the first resistance of the decade switch. The decade switch may also be formed of different value resistors which are individually mounted in the circuit to provide a stepped resistive path. As stated in connection with FIGURE 1a, a calibrated dial 19' is provided in this embodiment with the dial being calibrated in the ratio of the resistive path already traversed by the contact arm to the remaining portion of the resistive path. All other circuit connections are similar to the circuit shown in FIGURE 1b, and the operation of the arrangement of FIGURE 2 is similar to that of FIGURE 1.

Referring now to FIGURE 3, there is shown an arrangement similar to FIGURE 2 of the present invention for a decade box Wheatstone bridge arrangement. As shown, there is provided a housing 71 for the arrangement having four stationary decade switches 73a to 73d mounted within the housing and each provided with a movable contact arm 75a to 75d, respectively. The contact arms are attached to shafts 77 which protrude through the front panel of the housing 71 and have on their protruding end a knob 79. Thus, every switch 73 may be controlled independently. Further affixed to the shafts 77 is a dial 81 which indicates which of the resistance values has been inserted within the circuit by means of the switch 73. Above each knob 79 there is provided in the front panel of the housing an aperture 83 for viewing the values on the dial 81. There is further provided within the housing a stationary range selector switch 85 having a movable contact arm 87 affixed to the driving shaft 89.

The improved decade box bridge according to the present invention further includes that the shaft 77a, having the highest resistance units thereon, being provided with a Geneva movement 78 similar to that of FIGURE 1 which engages with an idler gear 80, one of which gears is fixed to the shaft 89 of the range selector or multiplier switch 85. There is also provided on the shaft 89 an indicator dial 93, the indications thereon being viewed through an aperture 95 provided in the front panel of the housing 71. In addition, a sprocket wheel 97 having sprockets 98 thereon is affixed to the shaft 89 of the multiplier switch. Additional sprocket wheels 97b, 97c and 97d are affixed to shafts 98 and have indicator dials affixed to the ends thereof, one of said wheels corresponding to each of the three remaining decade switches. The dials and the sprocket wheels are located over each of the three remaining decade switches 73b, 73c and 73d and additional apertures are cut into the front panel of the housing 71 so that each decade reading becomes an indication of which multiplier has been used. This is accomplished by providing an endless sprocket wheel belt 99 with holes 100 being provided in the belt at exact even intervals and which fit exactly over the sprockets 98 of the wheels 97. The belt is fitted over the first sprocket wheel 97a at the extreme left and the last sprocket wheel 97d located at the extreme right, and at the same time engages into sprockets of the two sprocket wheels located over the two decade switches in the center of the arrangement.

Figure 3B:
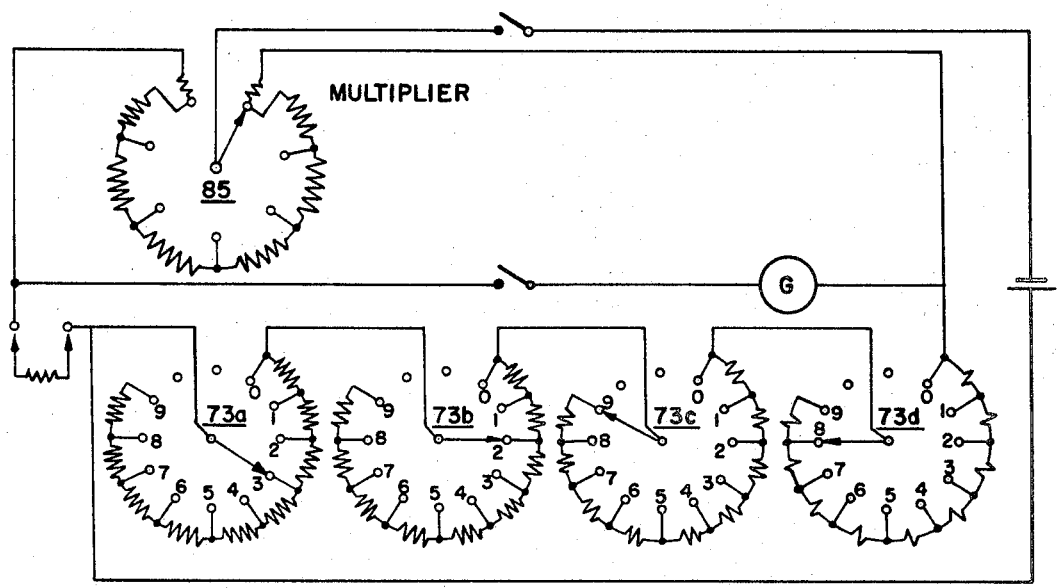

In this embodiment, as shown in FIGURE 3b, the decade switches 73 are connected in series, with each decade switch having nine resistors also connected in series. As shown, each decade switch may be individually controlled to provide the proper resistance with the indicator dial 81 showing the ratio resistance of that switch. Each decade switch comprises nine resistors since the decades are arranged, for example, in 1 ohm, 10 ohm, 100 ohm and 1,000 ohm resistances, thereby the switching from 9 ohms to 10 ohms is achieved by switching the decade switch 73d from 9 ohms to 0 ohms and switching the switch 73c from 0 ohms to 10 ohms as in the conventional type of decade box arrangements. However, the operation of the arrangement of the present invention is such that once the highest resistance decade switch, in this case 73a is moved through one complete revolution, the gearing arrangement 78, 80 engages and the multiplier switch 85, which in the present embodiment forms the ratio arms of the bridge with the ratio in resistance values of .001 ohm, .01 ohm, .1 ohm, etc. is switched to a higher multiplication factor, this being shown on the indicator dial 93. At the same time, the movement of the shaft causes the sprocket wheel 97 to turn and the remaining sprocket wheels also turn changing the multiplication factor on each of the associated dials, each corresponding to a respective decade switch. Thus, in the present invention, in addition to the coupling of the range selector to the ratio resistances, the resistance and the multiplication factor for each decade switch is always shown.

In FIGURE 4a, there is shown a Kelvin bridge arrangement according to the present invention. The Kelvin bridge is a version of the Wheatstone bridge network designed to eliminate, or greatly reduce, the effect of lead-in contact resistance so as to permit accurate measurements of low resistances. The Kelvin bridge arrangement includes a round or ribbon-type precision wire 111 mounted between two fixed posts 113a and 113b which are mounted on a panel 15 made of insulating material. There is also mounted on the panel 115 a metal sliding bar 117 having a metal slider member 119 for movement thereon, the slider having in its vertical plane an aperture 121 through which the slider bar 117 protrudes. The slider also has an aperture 123 in the horizontal plane thereof for viewing the scale of the slider bar. In the center of the aperture 123 a pointer 125 is attached to the slider which indicates the exact setting of the slider on the graduation of the calibrated slide wire printed on the slider bar. The other end of the pointer 125 is developed into a sliding contact 127 which slides along and makes contact with every point of the surface of the stretched out precision wire 111. For example, the contact 127 may be made of platinum.

Since it is an object of the present invention to provide means for simplifying the time-consuming task of balancing a bridge circuit, which in prior arrangements included the moving of the slider along the length of the wire and if the bridge could not be balanced in any one of these positions, stopping the movement and setting the range or multiplier switch onto the next higher or lower range until a balance is achieved, this task is simplified in accordance with the present embodiment wherein there are provided two bearing members 130, 131 and 132, 133, which are mounted beneath the panel 115. The front bearing members on each side 130 and 132 also are the switch bases for the range selector switch, each having a plurality of contacts thereon. A rotatable shaft 135 is provided for the bearing members 132, 133 and has affixed at one end thereof a knob 137. Also provided on the shaft 135 is a contact arm 139 for engaging the contacts of the bearing member 132, a sprocket wheel 141 and a ratchet wheel 143. The number of teeth on the ratchet wheel corresponds to the number of contacts in the bearing member 132 or a multiple thereof. Between the bearing members 130 and 131 there is also provided a shaft 145 having a contact arm 149 at the end thereof for engaging the contacts on bearing member 130 and forming a multiplier range switch. There is also provided on the shaft a sprocket wheel 151 similar to sprocket wheel 141 and a ratchet wheel 153 corresponding to ratchet wheel 143 but having its teeth in the opposite direction. There is further mounted on the shaft 145 an indicating wheel 155 which carries on its surface the multiplier numbers which become visible through an aperture 157 cut into the panel 115. The sprocket wheels 141 and 151 are coupled together with an endless belt 161 having sprocket holes therein and equal distances apart and which fit into the sprockets located on the sprocket wheels for coupling the movement of the two shafts. Pawls 161 and 162 are provided on the slide member 119 for engagement with the ratchet wheels 153 and 143, respectively. The pawl 161 will engage the ratchet wheel 153 when the slide member 119 is moved to the end of its sliding path on the left side of the arrangement and thereby switch the range selector switches 130 and 132 into the next lower range. When the slider member is moved to the end of its sliding path on the right side of the arrangement, the pawl 162 will engage the ratchet wheel 143 and throw the switches 130 and 132 into the next higher range.

Figure 4B:
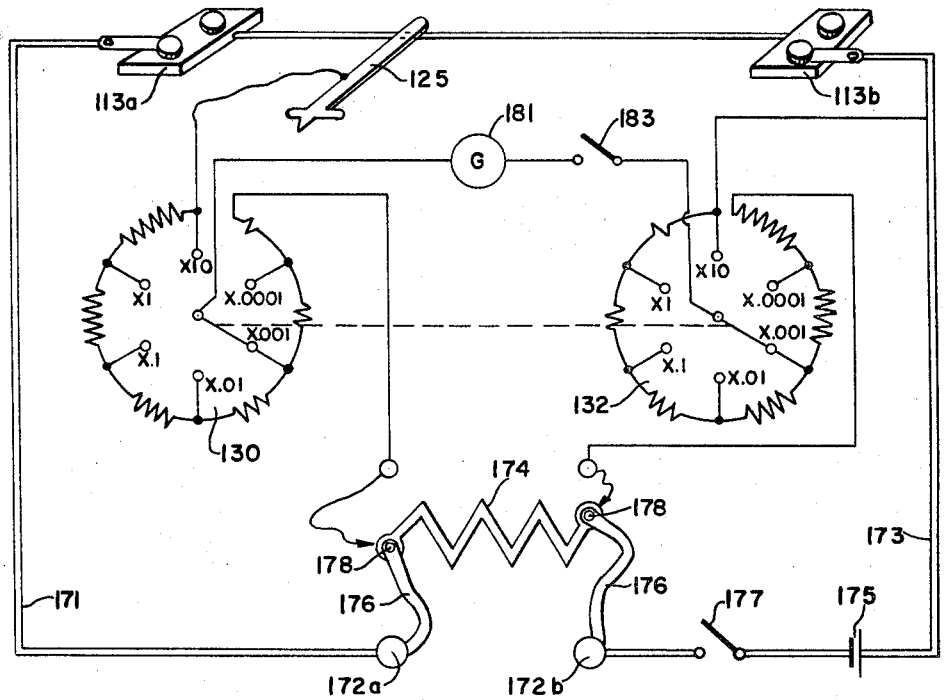

FIGURE 4b shows the circuit configuration for the Kelvin bridge described hereinabove. As shown, a connection 171 is provided between the mounting post 113a for the slide wire and one of the binding posts 172a for the unknown resistance 174 and another connection 173 between the other mounting post 113b through a battery 175 and a switch 177 to the other binding post 172b of the unknown resistance, the unknown resistance being connected between heavy wires 176 and additional contact points 178 to the binding posts. The aforedescribed connections are of a heavy physical construction, since a large current passes through them, in view of the extreme low resistance of the unknown resistor which is to be measured. As in the other circuit configurations, the multiplier switches include a plurality of resistors in series connection, the highest resistance of switch 130 being connected to the slide contact 125 and the lowest resistance being connected to a binding post from which a lead is connected to the resistor 174, the other switch 132 having a plurality of resistors connected in a similar manner to that of switch 130 has its lowest resistance connected through another binding post to the other terminal of the unknown resistor 174 and its highest resistance connected to the mounting post 113b, the contact arms of each switch are coupled together and are electrically connected through a galvanometer 181 and a switch 183. The provision of the two multiplier switches in this embodiment is to increase the sensitivity of the Kelvin bridge arrangement and protect against the high current. As stated previously, the operation of the device is such that the movement of the slide member 119 to either end of the arrangement will cause the respective pawl to engage with a ratchet wheel and throw the switches into the next higher or next lower range depending upon the movement of the slide block 119. Thus, the movement of a single member of the arrangement, that is, the slide member 119, causes a switching of the range selector switch until a balance has been obtained. It is also noted that if the range of the unknown resistance is known, the knob 137 may be turned to achieve the desired range, with the balancing achieved by movement of the slide member 119.

According to another feature of the arrangement shown in FIGURE 4a, only one multiplier switch is provided, such as switch 132 in order to provide an instrument of less sensitivity which may be used as student models in schools. In this arrangement, the circuit configuration is similar to that shown in FIGURE 1b, with the potentiometer 12 being replaced by the slide wire 111. The operation of this device is the same as that of FIGURE 4 in that since the sprocket wheels on each shaft are coupled together, the engagement of the pawl 161 with the ratchet wheel 153 will cause the switch 132 to move into the lower range, even though there is no switch 130 present.

Figure 5:
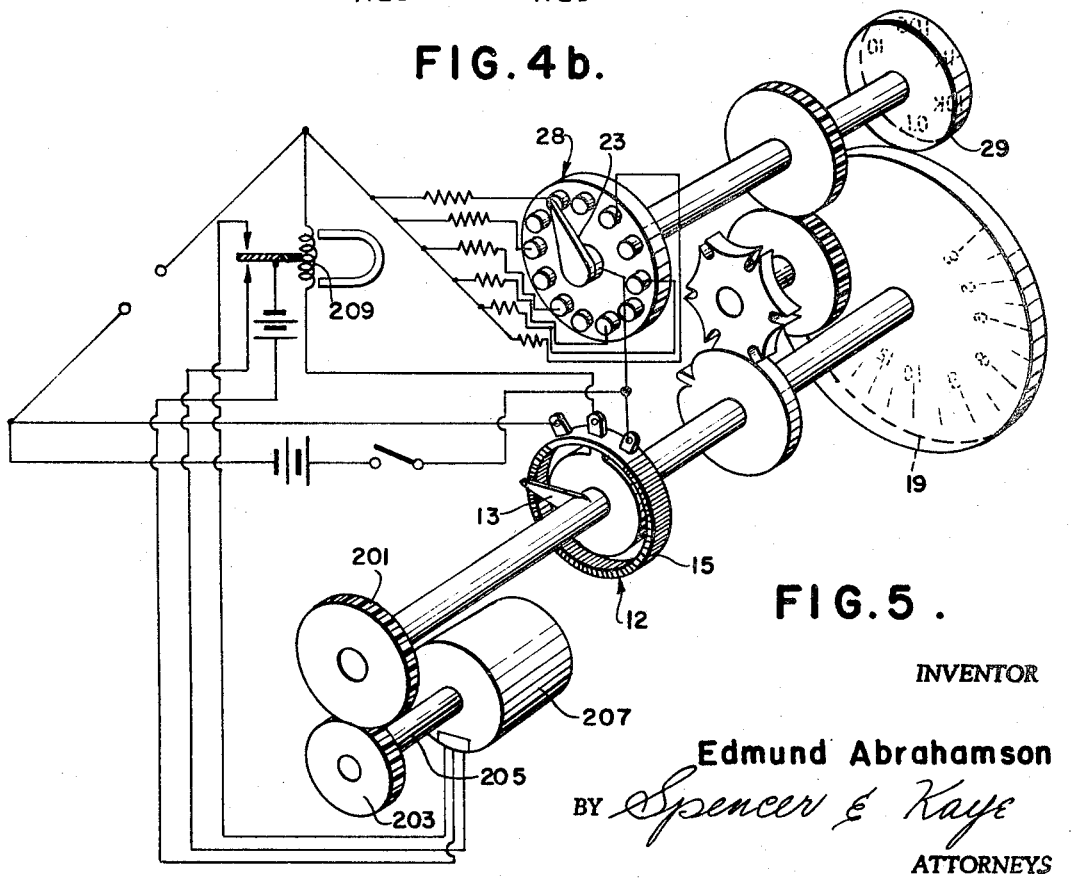
FIGURE 5 is a schematic perspective view of an embodiment according to the present invention including a motor for complete automatic operation.

A further embodiment of the present invention is shown in FIGURE 5, wherein there is provided a fully automatic bridge having a motorized operation. The arrangement of the embodiment for motorized operation is similar to that shown in FIGURES 1a and 1b. However, the shaft 11 in FIGURE 1 is extended past the contact arm 13 and has a toothed wheel 201 affixed to the end of the shaft for engaging a toothed wheel 203 mounted on a shaft 205 which is driven by a reversible motor 207. In the circuit arrangement of this embodiment, the galvanometer shown in FIGURE 1 is replaced by a sensitive double pole relay 209 connected to the motor and controlling the operation thereof. Each pole is connected to the motor and, in addition, the contact arm for the relay is connected through a battery also to the motor. Thus, there is provided a fully automatic Wheatstone bridge arrangement wherein the operator no longer must turn the knob 17 shown in FIGURE 1 in order to balance the bridge and which in fact does not include a knob. In this embodiment, the relay 209 will be energized depending upon the unbalancing of the circuit causing the motor to drive the shaft 205 and in turn shaft 11 in one direction or the other and as stated in connection with FIGURE 1, the movement of the contact arm 13 through one complete revolution will cause the contact arm 23 of the multiplier switch 28 to change to a higher or lower resistance and a different multiplication factor. Thus, the bridge is balanced, when the motor stands still or shuts itself off automatically. As shown in this embodiment, the multiplier switch 28 is not formed of series-connected resistances, but of individual resistors of the desired ohmic value which are individually switched into the circuit.

The motor may be a precision servo-type or it may be a simple common universal motor capable of running in both directions. A compound wound D.C. motor having a dynamic brake is preferable, in that it has the advantage that it will come to an immediate stop after the current has been cut off, which is very desirable in the automatic Wheatstone bridge arrangement. The conventional motor has the tendency to continue its rotation as a result of the force of inertia imparted to the armature, however, in the bridge arrangement of this invention it is desirable that the motor comes to a complete stop as soon as the relay cuts off the current, that is, when the bridge is balanced, and therefore a motor having a dynamic brake is preferred.

Thus, according to the present invention there is provided a gear arrangement for coupling the ratio arms of the bridge arrangement to the range selector switch and thereby providing a single control means which may be continuously moved until a balance is obtained. It is noted that although prior arrangements are somewhat similar to the present invention, the ratio arms of such arrangements were provided with stops so as to cause a returning of the ratio arm to the starting position, at which time the range selector was changed and thereby did not provide a coupling arrangement as described in the present invention. It is also noted that the gearing arrangement of the present invention has been described as a Geneva wheel, the gearing arrangement may take any suitable form. In addition, the contact members for the decade switches of the present invention have been shown as having more contacts than necessary. The additional contacts which are not electrically connected have been provided in order to keep the contact arm in the proper position when switching from one contact of the bridge arrangement to another.

It is also noted that although the circuit diagrams and the mechanical arrangements have shown that variable potentiometers have been coupled with range selectors, the present invention is not limited thereto. That is, many bridge circuits employ other variable controls such as variable condensers, induction coils, transformers and others for the measurement of these components, all of which may be coupled respectively to fixed condensers, induction coils, transformers or any combination thereof.

Although the circuit diagrams have been described as including a D.C. voltage source, the invention also relates to bridge circuits which employ an alternating high frequency voltage source. In such circuits a telephone may be used rather than a galvanometer whereby the telephone is plugged in where the galvanometer had been. The telephone provides an audible null detection wherein the audible hum noise produced thereby is decreased as the circuit is nulled.

It will be understood that the above description of the present invention is susceptible to various modifications, changes and adaptations, and the same are intended to be comprehended within the meaning and range of equivalents of the appended claims.

What is claimed is:
1. A bridge arrangement for determining the value of an unknown resistance comprising, in combination:
  a bridge circuit having four arms;
  means for connecting an unknown resistance into one arm thereof;
  a first variable resistance being connected in two arms thereof and having adjustable contact means for movement along the resistive path thereof, the position of said contact means defining the dividing point between the two arms of the bridge;
  a second variable resistance being connected in the other arm of the bridge and having adjustable contact means for movement to predetermined positions along the resistive path thereof;
  means for connecting detector means across two arms of the bridge circuit for detecting the balancing of said bridge arrangement;
  means for connecting a voltage source across another two arms of the bridge circuit; and
  means mechanically coupling said contact means of said first and second variable resistances for moving the contact means of one of said variable resistances from one position to another to vary the range of said bridge arrangement when the contact means of the other of said variable resistances has completed a traversal of the resistive path thereof.

2. A bridge arrangement as defined in claim 1 and further comprising indicating means associated with said contact means of said first and second variable resistances for indicating the position of said contact means along the respective resistive path thereof, and wherein said mechanical coupling means includes means connecting said indicating means with said respective contact means for moving said indicating means in accordance with the movement of said contact means.

3. A bridge arrangement as defined in claim 2 wherein said contact means for said first and second variable resistances are each arranged for movement about a circular path, said indicating means including a first dial associated with said contact means of said first variable resistance and a second dial associated with said contact means of said second variable resistance, and said connecting means including a first driving shaft and a second driving shaft connecting said first indicating dial and said contact means of said first variable resistance, and said second indicating dial and said contact means of said second variable resistance, respectively, at least said first driving shaft being capable of more than 360 degree movement in any direction of rotation.

4. A bridge arrangement as defined in claim 3 wherein said mechanical coupling means further includes a gear arrangement having a Geneva movement therein which engages only at a predetermined position after the contact member of one of said variable resistances has completed a traversal of the resistive path thereof and during the movement of the contact member in a circular path from one end of the resistive path to the other end.

5. A bridge arrangement as defined in claim 4 wherein said Geneva movement includes a driven wheel mounted on said first shaft and a cam in sliding engagement therewtih mounted on a third shaft, said gearing arrangement further including a first tooth wheel mounted on said second shaft and a second tooth wheel mounted on said third shaft for engagement with said first toothed wheel whereby the movement of said second shaft is in the same direction as the movement of said first shaft.

6. A bridge arrangement as defined in claim 5 wherein said indicating dial associated with said first variable resistance is provided thereon with calibrations indicative of the position of its respective contact member in terms of the ratio of resistance of the two arms of said bridge circuit, and said indicating dial associated with said second variable resistance is provided with calibrations indicative of the position of its contact member in terms of the resistance of the other arm of said bridge circuit.

7. A bridge arrangement as defined in claim 6 wherein said first variable resistance is provided with a slidewire resistive path.

8. A bridge arrangement as defined in claim 6 wherein said first and second variable resistances are provided with stepped resistive paths, respectively.

9. A bridge arrangement as defined in claim 1 wherein said second variable resistance includes a plurality of stepped resistive paths of differing ohmic value connected together in series, each path having an adjustable contact means for movement to predetermined positions along its respective resistive path, a plurality of first shaft means, each of which is connected to a single contact means, respectively, first indicating means mounted on said first shaft means for indicating the position of its respective contact means, along the respective resistive path thereof, a plurality of second shaft means, each of said second shaft means being arranged for association with one of said plurality of resistive paths, respectively, said second shaft means associated with the resistive paths of highest ohmic value having connected thereto the contact means of said first variable resistance, said mechanical coupling means connecting the contact means of said first variable resistance and said contact means of the resistive path of the highest ohmic value of said second variable resistance, second indicating means provided on each of said second shaft means for indicating the position of said contact means of said first variable resistance along the resistive paths thereof, and means coupling said second shaft means for moving said shaft means in accordance with the movement of said contact means of said first variable resistance.

10. A bridge arrangement as defined in claim 9 wherein said mechanical coupling means includes a gear arrangement having a Geneva movement therein which engages only at a predetermined position after the contact means associated with the resistive path of highest ohmic value of said second variable resistance has completed a traversal of the resistive path thereof and during the movements of the contact means from one end of the resistive path to the other end.

11. A bridge arrangement as defined in claim 10 wherein said means for moving said second shaft means includes a sprocket wheel provided on each of said second shaft means and an endless belt having sprocket holes therein for engagement with said sprocket wheels of each of said second shaft means for transmitting the movement of one of said second shaft means to the others thereof.

12. A bridge arrangement as defined in claim 11 further including housing means enclosing said bridge arrangement, each of said first shaft means protruding through said housing, a plurality of knob means, each of which is affixed to a respective protruding first shaft means and aperture means provided in the housing associated with each of said first and second indicating means for viewing said indicating means through the housing.

13. A bridge arrangement as defined in claim 1 wherein said mechanical coupling means includes pawl means coupled to said contact means of said first variable resistance and ratchet means coupled to said contact means of said second variable resistance, said pawl means engaging said ratchet means when the contact means of said first variable resistance has completed a traversal of the resistive path thereof to cause a movement of said ratchet wheel and said contact means of said second variable resistance to vary the position of said contact means and change the range of said bridge arrangement.

14. A bridge arrangement as defined in claim 13 wherein said first variable resistance is a stretched slide wire and said contact means moves along the length thereof, said pawl means includes first and second pawls arranged in opposite directions, said second variable resistance includes at least one resistive path, said mechanical coupling means further includes first and second shaft means arranged at the ends of said first resistive paths and having provided thereon first and second ratchet wheels having teeth facing in opposite directions for engagement with said first and second pawls, at least one of said shafts being connected to said contact means of said second variable resistance, means connecting said first and second shafts for moving one of said shafts in accordance with the movement of said other shaft, and indicating means provided on one of said shafts for indicating the position of said contact means of said second variable resistance, said contact means of said second variable resistance being moved by the movement of one of said shafts during the engagement of one of said pawls of said ratchet wheels.

15. A bridge arrangement as defined in claim 6 and further including motor means coupled to said contact member of said first variable resistance for driving said contact member until the bridge arrangement is balanced, and detector means connected to said detector connecting means for controlling the operation of said motor.

16. A bridge arrangement as defined in claim 15 wherein said motor is a reversible motor and said detector is a double pole relay which is energized upon the unbalancing of said bridge arrangement, one of said poles being energized for driving said motor in a first direction and the other pole being energized for driving the motor in a second direction.

17. A bridge arrangement as defined in claim 16 wherein said motor is provided with a shaft having a toothed wheel mounted thereon and a further toothed wheel mounted on said first shaft connected to said contact means of said first variable resistance, said toothed wheel of said motor and said further toothed wheel of said first shaft engaging for coupling the movement of said shaft of said motor to said contact means of said first variable resistance.

References Cited

UNITED STATES PATENTS

| | | | |
|---|---|---|---|
| 2,625,632 | 1/1953 | Onia et al. | 338—124 |
| 2,629,843 | 2/1953 | Berry | 338—124 |

OTHER REFERENCES

Rondeau, "Self-Balancing Resistance Bridge," General Electric Review, vol. 52, No. 10, October 1949, pp. 45–46.

RUDOLPH V. ROLINEC, *Primary Examiner.*

E. E. KUBASIEWICZ, *Assistant Examiner.*